United States Patent
Brusilovsky et al.

(10) Patent No.: US 9,996,058 B2
(45) Date of Patent: Jun. 12, 2018

(54) SYSTEMS AND METHODS FOR DYNAMIC MAPPING FOR END DEVICES OF CONTROL SYSTEMS

(71) Applicant: General Electric Company, Schenectady, NY (US)

(72) Inventors: Mikhail Brusilovsky, Newton, MA (US); Benjamin Edward McDonald, Holliston, MA (US)

(*) Notice: Subject to any disclaimer, the term of this patent is extended or adjusted under 35 U.S.C. 154(b) by 1064 days.

(21) Appl. No.: 14/135,528

(22) Filed: Dec. 19, 2013

(65) Prior Publication Data
US 2015/0177708 A1    Jun. 25, 2015

(51) Int. Cl.
G05B 11/01 (2006.01)
G05B 19/05 (2006.01)
G05B 19/418 (2006.01)
G05B 19/042 (2006.01)

(52) U.S. Cl.
CPC .......... *G05B 11/01* (2013.01); *G05B 19/0423* (2013.01); *G05B 19/4186* (2013.01); *G05B 19/058* (2013.01); *G05B 2219/14006* (2013.01); *G05B 2219/25217* (2013.01); *G05B 2219/25451* (2013.01); *G05B 2219/31335* (2013.01); *Y02P 80/114* (2015.11); *Y02P 90/185* (2015.11)

(58) Field of Classification Search
CPC .............. G05B 11/01; G05B 19/0423; G05B 19/4186; G05B 2219/25451; G05B 2219/25217; G05B 2219/31335; G05B 2219/14006; G05B 19/058; Y02P 90/185
See application file for complete search history.

(56) References Cited

U.S. PATENT DOCUMENTS

| | | | | |
|---|---|---|---|---|
| 5,867,686 A | * | 2/1999 | Conner | G06F 9/52 707/999.008 |
| 6,009,472 A | * | 12/1999 | Boudou | G06F 15/17 709/201 |
| 6,477,434 B1 | * | 11/2002 | Wewalaarachchi | G05B 19/418 700/17 |
| 6,560,235 B1 | | 5/2003 | Jones | |
| 6,687,805 B1 | * | 2/2004 | Cochran | G06F 11/2094 707/999.202 |
| 6,988,018 B2 | * | 1/2006 | Eames | D21F 1/483 162/351 |
| 7,246,193 B2 | * | 7/2007 | Rotvold | G05B 19/4186 710/305 |
| 7,467,018 B1 | * | 12/2008 | Callaghan | G05B 19/4186 700/1 |

(Continued)

OTHER PUBLICATIONS

PCT Search Report and Written Opinion dated Apr. 10, 2015 in relation to corresponding PCT application PCT/US2014/066967.

*Primary Examiner* — Charles Kasenge
(74) *Attorney, Agent, or Firm* — Mintz Levin Cohn Ferris Glovsky and Popeo, P.C.

(57) ABSTRACT

The subject matter disclosed herein relates to end devices (e.g., meters, sensors, pumps, etc.) of an industrial monitoring system or an industrial control system. A system includes an end device having processing circuitry configured to execute instructions stored in at least one memory device to enable the end device to collect and store a plurality of measurements of operational parameters of a monitored system in the at least one memory device according to a dynamic mapping that is updatable.

18 Claims, 3 Drawing Sheets

(56) References Cited

U.S. PATENT DOCUMENTS

| | | | | |
|---|---|---|---|---|
| 8,229,579 B2* | 7/2012 | Eldridge | ................ | G05B 15/02 |
| | | | | 700/31 |
| 8,700,807 B2* | 4/2014 | Huang | ................. | G06F 13/385 |
| | | | | 710/3 |
| 8,719,327 B2* | 5/2014 | Blevins | ................. | G05B 11/42 |
| | | | | 702/185 |
| 8,977,527 B2* | 3/2015 | McKim | ................... | G09B 9/00 |
| | | | | 700/29 |
| 9,414,665 B2* | 8/2016 | Saranow | ............. | A45D 44/005 |
| 2008/0082180 A1* | 4/2008 | Blevins | ................. | G05B 11/42 |
| | | | | 700/29 |
| 2008/0228306 A1* | 9/2008 | Yetter | ................ | G05B 23/0254 |
| | | | | 700/109 |
| 2012/0296470 A1* | 11/2012 | Saranow | ............... | A45D 19/06 |
| | | | | 700/239 |
| 2013/0179634 A1* | 7/2013 | Munireddy | ......... | G06F 11/2058 |
| | | | | 711/114 |
| 2014/0237164 A1* | 8/2014 | Le | ....................... | G06F 12/0246 |
| | | | | 711/103 |

\* cited by examiner

SYSTEMS AND METHODS FOR DYNAMIC MAPPING FOR END DEVICES OF CONTROL SYSTEMS

BACKGROUND

The subject matter disclosed herein relates to end devices (e.g., meters, sensors, pumps, etc.) of an industrial monitoring system or an industrial control system.

Monitoring and control systems may be used in a variety of applications, such as power generation systems (e.g., wind, water, steam, and gas turbine systems drivingly coupled to generators) and manufacturing systems (e.g., petroleum refineries, chemical manufacturing plants, and the like). For such monitoring and control systems, one or more controllers generally monitor and control the operation of the system. For example, certain end devices in the industrial control system (e.g., meters, sensors, pumps, valves, actuators, and the like) may be controlled by, and may provide monitoring data to, the industrial controller. Unfortunately, existing monitoring and control systems may not function with certain end devices, such as flow meter end devices, due to incompatibilities between the control system and the end device.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes an end device having processing circuitry configured to execute instructions stored in at least one memory device to enable the end device to collect and store a plurality of measurements of operational parameters of a monitored system in the at least one memory device according to a dynamic mapping that is updatable.

In another embodiment, a non-transitory, computer-readable medium stores instructions executable by processing circuitry of an electronic device. The instructions include instructions to receive user input requesting an addition of a field to a dynamic map of an end device. The user input includes a first user input identifying a piece of information stored or collected by the end device to be associated with the field, a second user input identifying a location in a memory device of the end device to be associated with the field, and a third user input identifying a data type, a data format, or both, to be associated with the field. The instructions include instructions to add the field in the dynamic map based on the user input.

In another embodiment, a method includes changing a mapping of an end device of an industrial control system from a first dynamic map to a second dynamic map, and wherein the first and second dynamic maps respectively define memory locations and data formats for storing measurement data collected by the end device during operation, and wherein the first and second dynamic maps are different from one another.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1A:
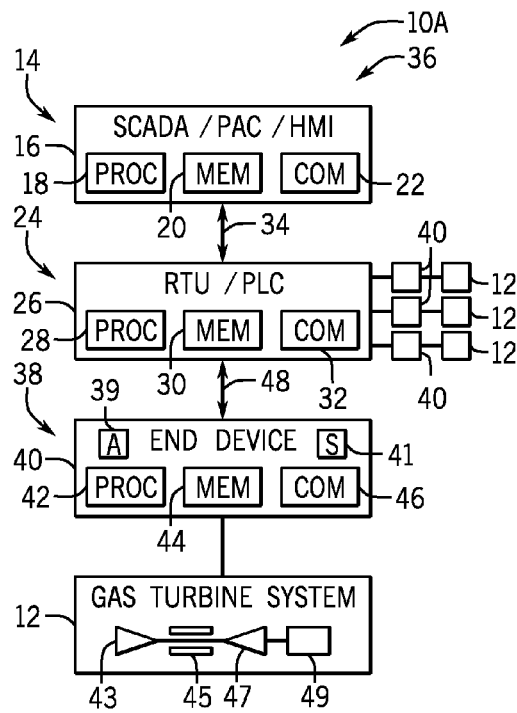
FIG. 1A is a schematic of an embodiment of a three-tiered control system coupled to a gas turbine system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

An industrial control system may include at least one controller coupled to a number of end devices via a control network. For example, a controller may receive data from a number of end devices of the control system in order to monitor and/or control a mechanical device or system (e.g., a gas turbine system, a petrochemical refinery, a chemical production system, water distribution systems, waste water purification systems, and so forth). Certain end devices include memory and processing circuitry that enables the end devices to store and execute instructions (e.g., firmware instructions) that define the behavior of the end devices. For example, the firmware of a flow meter end device may include instructions that define when and how the flow meter is to collect flow measurements for the monitored and/or controlled mechanical system.

The firmware of an end device (also referred to as a slave device or a field device) of a monitoring and/or control system may be programmed at the time of manufacturing or at a later time via a firmware update to define the behavior of the end device. Again, the end device may include measurement devices (e.g., sensors or meters), control devices (e.g., actuators, drive, valves, or pumps), or other electromechanical devices. For example, end devices may include flow meters, temperature sensors, pressure sensors, clearance sensors, vibration sensors, flame sensors, humidity sensors, gas composition sensors, speed sensors, or any combination thereof. The end devices may include sensing circuitry and associated components to acquire sensor data. The end device (e.g., a sensor or meter device) may include also memory circuitry (e.g., a number of registers) and processing circuitry, which may execute firmware instructions that result in collected measurements being stored in these registers in a particular manner, which is referred to herein as a "static map" or "static mapping." For an end device, a static map is a design plan that defines data types and locations within the memory circuitry (e.g., registers) of the end device for information recorded by the end device. The static map is not itself a set of instructions, but rather it is part of the design strategy when programming the end device and the controller. Further, a listing of the static map of an end device may generally be provided in the documentation for the end device. In general, based on the static map of the end device, the controller may be programmed to access particular memory spaces (e.g., registers) of the end device and may expect particular data and data types to be contained therein.

Accordingly, a controller may be programmed, based on the static map of an end device, to make appropriate read requests to the end device and properly interpret the data read from the memory locations (e.g., registers) of the end device. Since the controller may be programmed based on the static map of an end device, the static map of an end device may not change in order to avoid having to reprogram the controller. As such, a static map of an end device may be unchanged over the life of the end device and is generally a feature of (e.g., associated with or tied to) a particular model or brand of end device. Accordingly, a controller may be programmed to interface with particular end device models and/or brands based on each of their respective static maps.

With the foregoing in mind, present embodiments enable the use of a dynamic mapping system for an end device (e.g., measurement devices, such as sensors or meters) of an industrial control or monitoring system. The disclosed dynamic mapping system is implemented at the end device level and enables the end device to emulate the static mapping used by other end device models or brands. That is, the presently disclosed dynamic map may enable an end device to "spoof" another brand or model of end device, such that the controller can interface with the end device based on the static mapping of the "spoofed" end device, unaware of any difference. Further, the disclosed dynamic mapping system is customizable, enabling a user to alter the dynamic mapping of the end device at any point after manufacturing to emulate the static mapping of another end device model or brand. This enables a controller to communicate with a new or previously unknown end device without any additional programming via the dynamic mapping of the end device. Additionally, the disclosed dynamic mapping enables appropriate data type and/or data format conversions and also provides error checking to ensure that a particular dynamic register map does not include errors (e.g., duplications, overlaps, or conflicts). In certain embodiments, the disclosed dynamic mapping system may allow the dynamic map to be created by a number of different devices (e.g., the end device, the controller, or a computer) of the control system, based on user input, and then the dynamic map may be subsequently transferred to the memory circuitry of the end device for validation and implementation.

FIG. 1A is an embodiment of an industrial control system 10A, which is monitoring and/or controlling the operation of a particular system 12, such as the gas turbine system 12. It should be appreciated that the gas turbine system 12 is merely provided as an example, and, in certain embodiments, the monitored or controlled system 12 may be a gasification system, a wind turbine system, a water turbine system, a steam turbine system, power generation system (e.g., one or more turbine driven generators), a water processing system, a chemical production system, or any other system that may be monitored and/or controlled. The control system 10A illustrated in FIG. 1A is divided into three levels or tiers. The top level 14 includes a supervisory controller 16, which may be a supervisory control and data acquisition (SCADA) controller, a programmable automation controller (PAC), a human-machine interface (HMI) controller, or another controller suitable to control the industrial control system 10A. Accordingly, the supervisory controller 16 includes processing circuitry 18, memory circuitry 20, and communication circuitry 22. As mentioned above, the supervisory controller 16 may include instructions stored in the memory circuitry 20 that, when executed by the processing circuitry 18, enables the supervisory controller 16 to communicate with other devices in the control system network 10A. It may be appreciated that, in certain embodiments, more than one supervisory controller 16 (e.g., a SCADA controller and an HMI controller) may be present at the top level 14 of the industrial control system 10A.

Additionally, the second level 24 of the industrial control system 10A illustrated in FIG. 1A includes an intermediate controller 26, which may be a remote terminal unit (RTU), a programmable logic controller (PLC), or another suitable intermediate controller 26. That is, the intermediate controller 26 may monitor and control one or more end devices 40 of the industrial control system 10A, based on instructions received from the supervisory controller 16, and may transmit data collected by the one or more end devices (e.g., end device 40, discussed below) to the supervisory controller 16. As such, the intermediate controller 26 illustrated in FIG. 1A includes processing circuitry 28, memory circuitry 30, and communication circuitry 32 that enable the intermediate controller 26 to perform the aforementioned tasks. As illustrated in FIG. 1A, the supervisory controller 16 and the intermediate controller 26 may be communicatively coupled to one another via a portion 34 of a control system network 36, which may include any suitable wired or wireless communication methods or protocols. In certain embodiments, more than one intermediate controller 26 (e.g., a RTU controller and a PLC) may be present at the second level 24 of the industrial control system 10. Additionally, in certain embodiments, multiple redundant supervisory controllers 16 and/or multiple redundant intermediate controllers 26 may be used, which may to render the control system 10A more robust to individual device failure.

The third level 38 of the industrial control system 10A illustrated in FIG. 1A includes one or more end devices 40 that are communicatively coupled to the intermediate controller 26. Each end device 40 includes processing circuitry 42, memory circuitry 44, and communication circuitry 46 that enable the end device 40 to perform measurements and store data pertaining to the operation of the monitored system 12. Further, these components enable the end device 40 to provide the stored data to at least one controller (e.g., intermediate controller 26 and/or supervisory controller 16) of the industrial control system 10. As illustrated in FIG. 1A, the end device 40 and the intermediate controller 26 may be communicatively coupled to one another via a portion 48 of the control system network 36, which may include any suitable wired or wireless communication methods and/or protocols.

The end device 40 may include one or more actuator components 39, one or more sensor components 41 (e.g., sensing circuitry), or any combination thereof. The actuator and/or sensor components 39 and 41 of the end device 40 may be coupled to, and used to monitor and/or control, various components of the gas turbine system 12, such as a compressor 43, a combustor 45, a fuel nozzle, a fuel supply system, a diluent supply system, a turbine 47, a generator 49, or any combination thereof. By specific example, the end device 40 (e.g., with flow meter sensing components 41) may be a flow meter end device that is coupled to a portion of the gas turbine system 12 in order to monitor the flow rate of an intake fluid flow and/or an output fluid flow of the gas turbine system 12. For example, the flow meter 40 may monitor a liquid and or gas flow rate of air, fuel, diluents, exhaust gas, lubricant, or any combination thereof. As such, the flow meter end device 40 may store instructions (e.g., firmware instructions) in the memory circuitry 44 that are executed by the processing circuitry 42 to cause the flow meter end device 40 to determine flow rate measurements at particular times, and to store the determined flow rate measurements in particular portions (e.g., at particular addresses and/or within particular registers) of the memory circuitry 44. Additionally, in certain embodiments, the memory circuitry 44 may store diagnostic values (e.g., gain, signal to noise ratio, uptime, communication or access logs, and so forth) in addition to measurement values (e.g., flow rate, temperature, pressure, rotation rate, and so forth).

As discussed in greater detail below, the processing circuitry 42 of the end device 40 also executes instructions stored in the memory circuitry 44 to implement a dynamic register map, whereby the locations and/or data formats of the monitoring data stored within the memory circuitry 44 of the end device 40 may be altered. As discussed below, the dynamic register map may enable the end device 40 to emulate or mimic the behavior of a different end device (e.g., a different brand or model of end device). That is, while the PLC 26 could be reprogrammed to access certain memory locations of an end device 40 in order to control a particular model of the end device 40, the presently disclosed dynamic addressing enables communication between the PLC 26 and the end device 40 without reprogramming of the PLC 26. For example, the PLC 26 may be a flow computer PLC 26 (e.g., an OMNIFLOW® computer) that only supports a limited number of different models of flow meter end devices 40 based on the known static maps of supported flow meter end devices 40. Prior to the present approach, if the flow computer PLC 26 was not specifically programmed based on the static map of a particular end device 40, then the particular end device 40 would not be supported without reprogramming the flow computer PLC 26, which may be an expensive and time-consuming process. However, the presently disclosed dynamic addressing enables a PLC 26 (e.g., a flow computer PLC 26) to communicate with (e.g., to correctly access and process) a particular end device 40, even though the PLC 26 is not actually programmed to communicate with the particular end device 40.

Figure 1B:
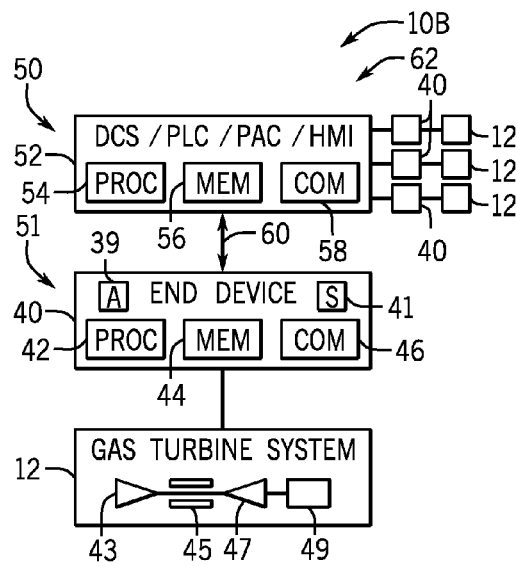
FIG. 1B is a schematic of an embodiment of a two-tiered control system coupled to a gas turbine system.

FIG. 1B is an embodiment of an industrial control system 10B, which is monitoring and/or controlling the operation of a gas turbine system 12. Unlike the industrial control system 10A illustrated in FIG. 1A, the illustrated control system 10B of FIG. 1B is divided into only two levels or tiers: a first level 50 and a second level 51. The first level 50 includes a controller 52, which may be a distributed control system (DCS), a programmable logic controller (PLC), a programmable automation controller (PAC), a human-machine interface (HMI) controller, or another controller suitable to control the industrial control system 10B. Accordingly, the controller 52 includes processing circuitry 54, memory circuitry 56, and communication circuitry 58 that enables the controller 52 to monitor and control operation of the end device 40 disposed in the second level 51. That is, unlike the industrial control system 10A illustrated in FIG. 1A, the industrial control system 10B illustrated in FIG. 1B does not use an intermediate controller 26, and, as such, the controller 52 may directly communicate with the end device 40 over a portion 60 of a control system network 62, which may include any suitable wired or wireless communication methods and/or protocols. In certain embodiments, multiple redundant controllers 52 may be used, which may to render the control system 10B more robust to individual device failure.

Figure 2:
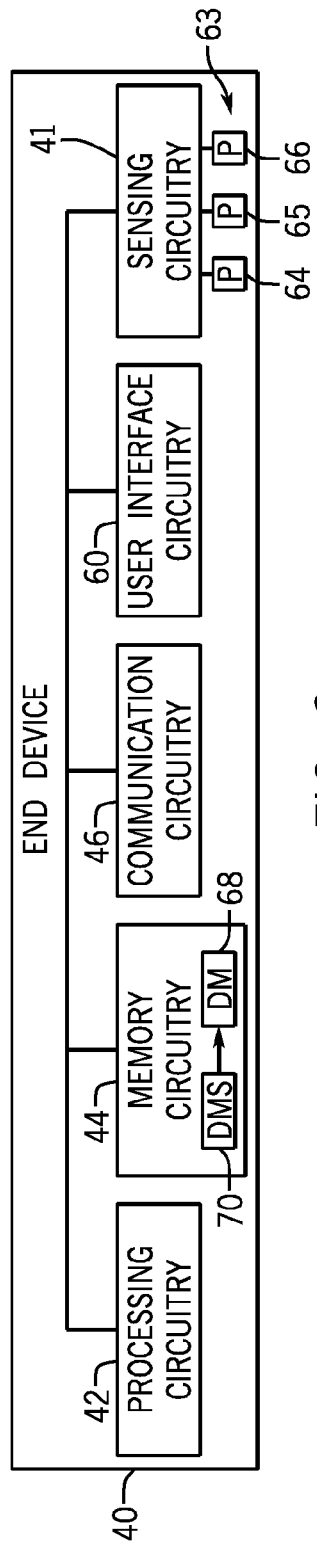
FIG. 2 is a schematic of an embodiment of an end device, such as a sensor or meter (e.g., flow meter)

With the foregoing in mind, FIG. 2 is a schematic illustrating certain internal components for an embodiment of an end device 40, in accordance with an embodiment of the present approach. In addition to the processing circuitry 42, the memory circuitry 44, and the communication circuitry 46 discussed above, the end device 40 illustrated in FIG. 2 also includes user interface circuitry 60 and sensing circuitry 41, which may be coupled to one or more probes 63 (e.g., probe 64, 65, and 66). The probe 63 may include temperature probes, pressure probes, vibration probes, optical probes, acoustic probes, or any combination thereof. The processing circuitry may include a general purpose microprocessor (e.g., a complex instruction set computing (CISC) or a reduced instruction set computing (RISC) processor), such as is commonly used in general purpose computing devices, or a specialized data processor (e.g., field-programmable gate array (FPGA)). The memory circuitry 44 may include cache, volatile memory (e.g., dynamic random access memory (DRAM)), nonvolatile memory (e.g., flash memory and/or read-only memory (ROM)), and/or registers. In certain embodiments, such registers may physically be a component (e.g., a register) of the processing circuitry 42 or may be defined locations (e.g., segments, partitions, or blocks) within the memory circuitry 44. Additionally, the sensing circuitry 41 may include any suitable sensor or collection of sensors suitable for performing measurements of the monitored system 12 (e.g., gas turbine system 12) via the probes 63. For example, the sensing circuitry 41 may include sensors capable of measuring temperature, pressure, flow rate, rotational rate, clearance, deflection, electrical resistance, torque, acceleration, gas composition, vibration, acoustic, or any other suitable operational parameter of the monitored system 12.

As mentioned above, the memory circuitry 44 may store instructions (e.g., firmware instructions) that, when executed by the processing circuitry 42, enable the end device 40 to perform measurements of a monitored system (e.g., gas turbine system 12), and to store the measurements in a portion of the memory circuitry 44. Additionally, the communication circuitry 46 may enable one or more controllers (e.g., controllers 16, 26, or 52) to communicate with the end device 40. In certain embodiments, the processing circuitry 42, the memory circuitry 44, and the communication circuitry 46 may cooperate to enable the end device 40 to communicate with other devices of the industrial control system 10A or 10B (e.g., one or more of controllers 16, 26, and 52) in accordance with a particular communication protocol. By specific example, in certain embodiments, the end device 40 may be functional to communicate with other devices according to the MODBUS® protocol (maintained by the Modbus Organization), which is a serial communications protocol used to exchange data in an industrial control network (e.g., industrial control network 36 or 62), or suitable derivatives thereof. In other embodiments, other communication protocols may be used, such as another register-based or message-based input-output (I/O) protocol suitable for use in a control system network.

Using the MODBUS protocol or another suitable protocol, the end device 40 may receive read requests from a controller (e.g., controller 16, 26, or 52). The read requests received from the controller may identify a particular portion (e.g., a location or register, or a range of locations or registers) of the memory circuitry 44 that contains a measurement of interest to the controller. As set forth above, the locations (e.g., registers) within the memory circuitry 44 requested by the controller are selected based on the static mapping that the controller is programmed to use to communicate with the particular end device 40. In other words, the controller (e.g., controller 16, 26, or 52) is configured to read particular locations or registers in the memory circuitry 44 of the end device 40 based on the static map that is associated with the particular manufacturer, model, and brand of the end device 40.

However, the memory circuitry 44 of the end device 40 illustrated in FIG. 2 also stores instructions (e.g., dynamic mapping system 70) that, when executed by the processing circuitry 42, implement a dynamic map 68 (e.g., dynamic register map) in place of the typical static map. Like the static map described above, a dynamic map or dynamic mapping 68 defines locations (e.g., addresses or registers) and data types for measurements stored by the end device 40 that are accessible to be read by a controller (e.g., controller 16, 26, or 52) of the industrial control system 10A or 10B. However, unlike the static map discussed above, the dynamic map 68 (e.g., dynamic register map) may be updated or altered at any point after manufacturing the end device 40 to enable the end device 10 to store and provide data differently than it was originally programmed to do. For example, the dynamic map 68 may enable an end device 40 to store measurements in different locations (e.g., different modules, addresses, or registers) and/or in different data formats (e.g., different sizes or different data types) than those dictated by the original static mapping of the end device 40. As such, the disclosed dynamic map 68 enables the end device 40 to mimic or spoof the static map of another type of end device of a different manufacturer, model, and/or brand using this dynamic mapping 68 such that the controller may access the end device, unaware of the spoofing. In other words, the disclosed dynamic mapping system 70 enables a modification in the operation of the end device 40 to enable the end device 40 to communicate within particular control systems 10A or 10B. Furthermore, as set forth below, the disclosed dynamic mapping system 70 provides a dynamic map configuration tool that may allow a user to select or define a dynamic map 68 for the end device 40 that describes how and where the measurements are to be stored within (and read from) the memory circuitry 44 of the end device 40.

It may also be appreciated that the components of the end device 40 illustrated in FIG. 2 may enable the end device 40 to receive or to locally construct a dynamic map 68 for the end device 40. For example, in certain embodiments, the end device 40 may receive, verify, and implement a dynamic map 68 from another device (e.g., controller 16, 26, or 52) of the industrial control system 10A or 10B. In certain embodiments, the end device 40 may include user interface circuitry 60 that provide mechanisms (e.g., a graphical user interface (GUI)) for a user to locally create a new dynamic map 68 for the end device or to select an existing dynamic map (e.g., preprogrammed into the memory circuitry 44) for implementation on the end device 40. For example, in certain embodiments, the user interface circuitry 60 may include one or more output devices (e.g., screens, speakers, indicator lights, etc.) as well as one or more input devices (e.g., touchscreens, switches, buttons, knobs, pointing devices, etc.) that may enable a user to directly interact with the end device 40 to construct a new dynamic map 68 or to select an existing dynamic map 68 to be implemented by the end device 40.

Figure 3:
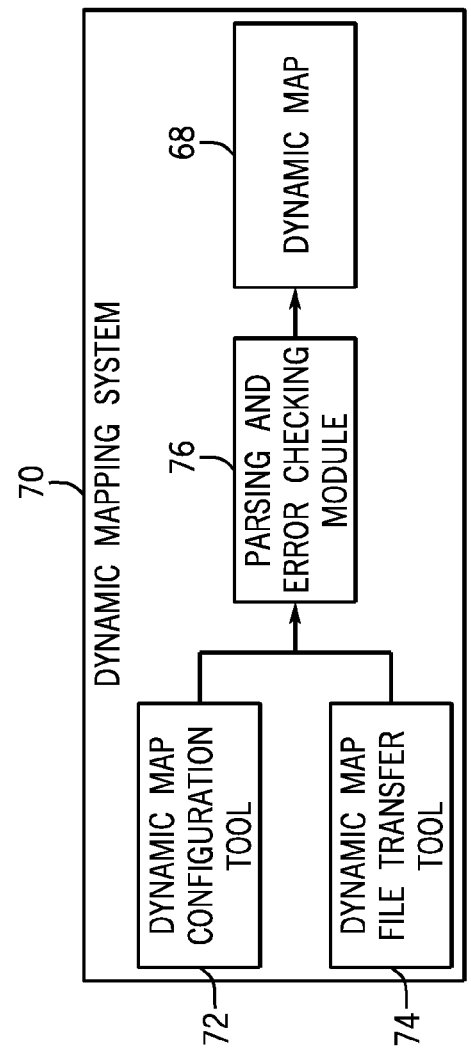
FIG. 3 is a schematic of an embodiment of a dynamic mapping system.

With the foregoing in mind FIG. 3 illustrates an embodiment of the dynamic mapping system 70 (e.g., dynamic register mapping system). The dynamic mapping system 70 illustrated in FIG. 3 may include a number of instructions stored in the memory circuitry 44 and executed by the processing circuitry 42 of the end device 40 to provide the illustrated components. In particular, the dynamic register mapping system 70 illustrated in FIG. 3 includes a dynamic map configuration tool 72, a dynamic map file transfer tool 74, a parsing and error checking module 76, and a dynamic map 68. As set forth above, the dynamic map 68 may include a set of instructions that define how and where measurements are to be stored within (and subsequently read from) the memory circuitry 44 of the end device 40. Furthermore, as set forth above, unlike a static map, the dynamic map 68 enabled by the dynamic mapping system 70 may be changed, altered, or updated to a different dynamic map 68 at any point after the manufacture of the end device 40.

For the embodiment illustrated in FIG. 3, the dynamic map 68 may be created using the dynamic map configuration tool 72. As mentioned above, in certain embodiments, the dynamic map configuration tool 72 may be stored in the memory circuitry 44 and executed by the processing circuitry 42 of the end device 40. For such embodiments, the user interface circuitry 60 of the end device 40 may receive user inputs that may be used in the construction of the dynamic map 68. Additionally, in certain embodiments, the dynamic map configuration tool 72 may enable a user provide inputs to select from a set of predefined or pregenerated dynamic maps (e.g., stored in the memory circuitry 44). For example, in certain embodiments, this set of predefined dynamic maps may include dynamic maps that allow the end device 40 to emulate the static map of other end devices that are similar to the end device 40. By specific example, the predefined dynamic maps stored in the memory circuitry 44 of a flow meter end device 40 may include dynamic maps that correspond to static maps of other common or popular models and/or brands of flow meter end devices. In other embodiments, the dynamic map configuration tool 72 may take the form of a simple text editor (e.g., executed by the end device 40, by a controller 16, 26, or 52, or by a general purpose computer coupled to the control system network 36 or 62), which may allow the user to provide inputs (e.g., text-based instructions) to construct the dynamic map 68.

In certain embodiments, the dynamic map configuration tool 72 and the dynamic map file transfer tool 74 may be stored in the memory circuitry (e.g., memory circuitry 20, 30, or 56) and executed by the processing circuitry (e.g., processing circuitry 18, 28, or 54) of a suitable controller (e.g., controller 16, 26, 52, or a suitable general purpose computer coupled to the control system network 36 or 62). For these embodiments, the dynamic map file transfer tool 74 may enable the executing processor to transfer (e.g., upload or download) the dynamic map 68 to another device in the control system 10A or 10B. For example, in an embodiment, a HMI controller 16 may store and execute the dynamic map configuration tool 72, which enables the HMI controller 16 to receive user inputs and to generate the dynamic map 68 based on these user inputs. For this example, the HMI controller 16 may also store and execute the dynamic map file transfer tool 74, which enables the HMI controller 16 to export the generated dynamic map 68 to the end device 44 for validation and implementation. Accordingly, in certain embodiments, the end device 40 may also store and execute the dynamic map file transfer tool 74, which enables the end device 40 to receive the generated dynamic map 68 from other devices (e.g., controllers 16, 26, or 52) in the control system 10A or 10B. Furthermore, in certain embodiments, the dynamic map file transfer tool 74 may also enable the end device 40 to export a dynamic map 68 to another device (e.g., controller 16, 26, 52, or another suitable device), for analysis and/or storage.

Accordingly, the end device 40 may receive a dynamic map 68, either from the output of the dynamic map configuration tool 72 being executed locally on the end device 40, or from the dynamic map file transfer tool 74 upon receiving a dynamic map 68 from another device in the control system 10A or 10B. In either case, the parsing and error checking module 76 that is stored in the memory circuitry 44 and executed by the processing circuitry 42 validates the dynamic map 68, ensuring that the dynamic map 68 is free from particular defects. For example, in certain embodiments, the parsing and error checking module 76 may ensure that addresses or locations in the memory circuitry 44 (e.g., particular registers) are valid memory addresses that are not in conflict (e.g., duplicated) within the dynamic map 68. By further example, in certain embodiments, the parsing and error checking module 76 may ensure that each field within the dynamic map 68 is allotted a suitable amount of space (e.g., 1 register, 2 registers, or more than 2 registers) within the memory circuitry 44 of the end device, based on the data type and/or data format of the field within the dynamic map 68. By still further example, in certain embodiments, the parsing error checking module 76 may ensure that particular addresses or locations in the memory circuitry 44 associated with each field in the dynamic map 68 are not overlapping. It should be appreciated that these examples are not limiting, and that other parsing and error checking (e.g., file integrity checking) may be performed without negating the effect of the present approach. Accordingly, once the dynamic map 68 has successfully passed the parsing and error checking module 76, the dynamic map 68 may be implemented by the end device 40 to dictate how and where data is to be stored in, and later accessed from, the memory circuitry 44 of the end device 40.

Figure 4:
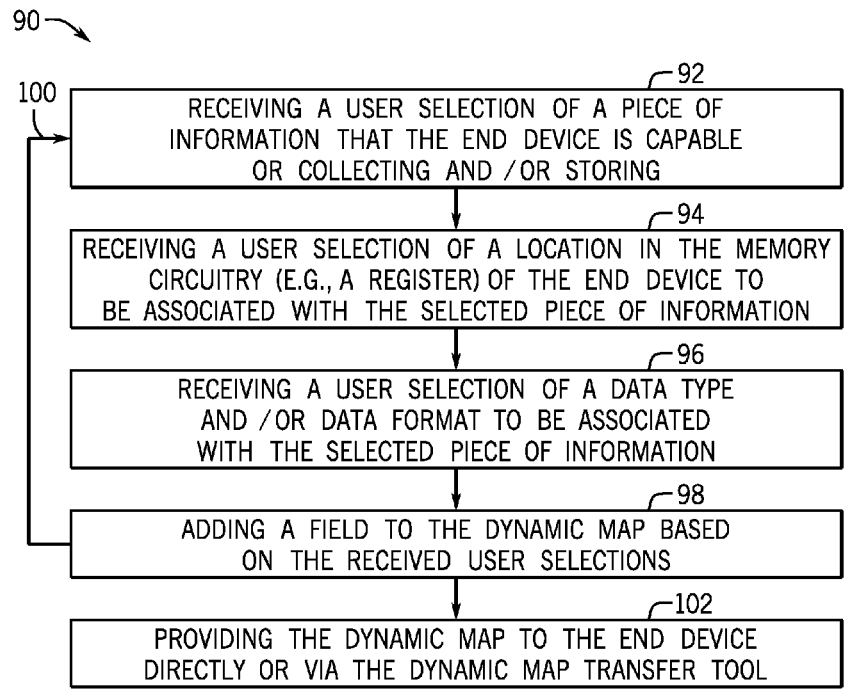
FIG. 4 is a flow diagram illustrating an embodiment of a process for generating a dynamic map.

FIG. 4 is a flow diagram illustrating an embodiment of a computer-implemented process 90 whereby the dynamic map configuration tool 72 generates the dynamic map 68 based on user input. The process 90 may be executed by any suitable processor of the control system 10A or 10B (e.g., processing circuitry 18, 28, 42, 54, or another suitable processor). The process 90 illustrated in FIG. 4 begins with the processor receiving (block 92) a user selection of a piece of information (e.g., measurement data, unit data, manufacturer data, model data, firmware data, etc.) that the end device is capable of collecting and/or storing. For example, in certain embodiments, the processor may receive this user input from user interface circuitry 60 of the end device 40, or from user interface circuitry associated with another component of the control system 10A or 10B. Additionally, in certain embodiments, the processor may first output to the user a list of all of the pieces of information that the end device 40 collects (e.g., measurement data) and/or stores (e.g., unit data, manufacturer data, model data, firmware data, etc.), and the user may subsequently provide user input to select one or more particular pieces of information from the list.

Next in the process 90 illustrated in FIG. 4, the processor may receive (block 94) a user selection of a location within the memory circuitry 44 of the end device 40 to be associated with the piece of information selected in block 92. That is, the processor may receive user input that identifies a particular location (e.g., address or register) within the memory circuitry 44 of the end device 40 where the user desires the selected piece of information to be stored. It may be appreciated that, in certain embodiments, the dynamic map configuration tool 72 may provide a graphical user interface (GUI) that may enable the user to interact with visual elements (e.g., a collection of blocks labeled with particular pieces of information collected and/or stored by the end device 40) and can receive user inputs regarding the desired position for the selected piece of information (e.g., in a drag-and-drop fashion).

Additionally, the processor may receive (block 96) a user selection of a data type and/or data format to be associated with the piece of information selected in block 92. For example, in certain embodiments, the processor may receive a user selection indicating a data type (e.g., a bit, an integer, a floating point number, a double-precision floating point number, a character, a string, or another suitable data type) and/or a data format (e.g., number of bits or bytes, level of precision, a unit of measurement, and so forth) for the piece of information. In certain embodiments, the data type and/or data format indicated by the user selection may not correspond with the data type and/or data format of the piece of information as collected or stored by the end device 40. In such embodiments, the information collected and/or stored by the end device 40 may be converted by the processing circuitry 42 of the end device 40 during operation, based on the contents of the dynamic map 68. This conversion may involve data type conversion (e.g., converting a two-byte integer into a one-byte integer, a four-byte floating point number into an eight-byte double-precision floating point number, and so forth), which may include rounding, truncation, or other data type conversions. It may also be appreciated that this conversion may also involve data format conversion (e.g., converting a measurement from degrees Celsius to degrees Kelvin or from pounds per square inch to kilograms per square meter), which may involve one or more calculations based on formula stored in the memory circuitry 44 of the end device 40. It may also be appreciated that, in certain embodiments, the dynamic map 68 may also enable the performance of calculations (e.g., determining a total flow based on a measured flow rate per unit time and a measured length of time, determining a density based on a measured weight and a measured volume, or other suitable calculations) using more than one piece of data stored in the memory circuitry 44 and/or collected by the sensing circuitry 41. In other words, the dynamic map 68 may instruct the processing circuitry 42 of the end device 40 how to combine (e.g., add, subtract, multiply, divide, or another suitable mathematical operation) multiple measurements collected by the sensing circuitry 41 according to a particular formula or equation, and then instruct the processing circuitry 42 to store the output in a particular portion (e.g., a particular register) of the memory circuitry 44 of the end device 40.

After receiving the user selections of the desired piece of information (in block 92) as well as the desired location (in block 94) and the desired data type and/or data format (in block 96) for the piece of information, a field may be added (block 98) to the dynamic map 68, based on the user selections. For example, in block 92, the processor may receive the user selection of a particular flow rate measurement collected by a flow meter end device 40 of the control system 10A or 10B. The processor may also receive, in block 94, the user selection of a particular register (e.g., register number "101") of the flow meter end device 40, wherein the user desires to store the particular flow rate measurement. Additionally, the processor may also receive, in block 96, the user selection of a particular data type (e.g., two-byte integer) and data format (e.g., units of liters per minute). Accordingly, in block 98, the processor may add a field to the dynamic map 68 that defines the location (e.g., register number "101"), the data type (e.g., two-byte integer), and the data format (e.g., units of liters per minute) for the selected flow rate measurement. As indicated by the arrow 100, the steps in blocks 92, 94, 96, and 98 may be repeated in order to add subsequent fields to the dynamic map 68. In certain embodiments, the dynamic map configuration tool 72 may additionally include functionality to alter (e.g., change the piece of information, the location of the piece of information, or the data type and/or data format of the information) a field of the dynamic map 68 based on user inputs. Furthermore, in certain embodiments, the dynamic map configuration tool 72 may additionally include functionality to delete a field of the dynamic map 68, based on user inputs.

Accordingly, after executing block 92, 94, 96, and 98, the processor may provide (block 102) the dynamic map 68 to the end device 40 directly or via the dynamic map transfer tool 74. For example, if the dynamic map configuration tool 72 was executed locally by the processing circuitry 42 of the end device 40, the generated dynamic map 68 may be provided directly to the memory circuitry 44 of the end device 40. By further example, if the dynamic map configuration tool 72 is executed remotely by the processing circuitry of another device in the control system 10A or 10B (e.g., by the controllers 16, 26, or 52), then the processor may provide the dynamic map 68 to the end device 40 over a portion of the control system network 36 or 62 using the dynamic map file transfer tool 74. In certain embodiments, the end device 40 may normally function to receive configuration information from a controller (e.g., controllers 16, 26, or 52) that defines inputs (e.g., pipe diameter, fluid type, fluid density, etc.) that the end device 40 may use when collecting measurement data. Accordingly, in certain embodiments in which the dynamic map 68 is provided to the end device 40 from a controller (e.g., controller 16, 26, or 52), the end device 40 may receive this configuration information together with the dynamic map 68 from the controller at the same time. This may improve efficiency and reduce bandwidth consumption within the control system networks 36 or 62.

Figure 5:
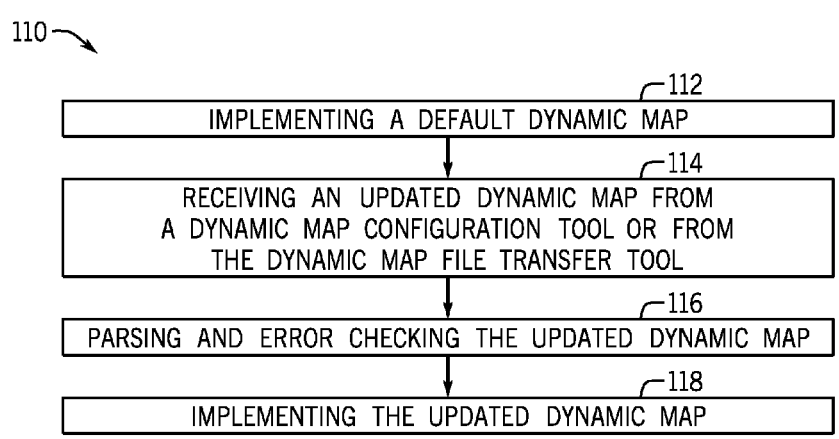
FIG. 5 is a flow diagram illustrating an embodiment of a process by which a dynamic map may be transferred, checked, and implemented.

FIG. 5 is a flow diagram illustrating an embodiment of a computer-implemented process 110 whereby the end device may implement an updated dynamic map 68. The illustrated process 110 begins with the processing circuitry 42 of the end device 40 implementing (block 112) a default dynamic map 68. For example, in certain embodiments, at the time of manufacturing the end device 40 may be loaded with and configured to use a default dynamic map 68 that defines the location and format of the information collected and/or stored by the end device 40. However, since the default mapping of the end device 40 is dynamic, the default dynamic map 68 may be replaced at a later time with an updated dynamic map 68 that defines different locations and/or different formats for the information collected and/or stored by the end device 40.

Accordingly, the illustrated process 110 continues with the processing circuitry 42 of the end device 40 receiving (block 114) the updated dynamic map 68. In certain embodiments, the updated dynamic map 68 may be received from the dynamic map configuration tool 72 executed on the processing circuitry 42 of the end device 40. In other embodiments, the updated dynamic map 68 may be received from the dynamic map file transfer tool 74 executed on the processing circuitry 42 of the end device 40 to receive the updated dynamic map 68 from another device in the control system 10A or 10B. Subsequently, the processing circuitry 42 of the end device 40 may parse (block 116) and error check the received updated dynamic map 68. If an error is encountered during validation of the updated dynamic map 68, the end device 40 may not implement the updated dynamic map 68 and, instead, may continue using the default dynamic map 68. Further, in certain embodiments, when an error is encountered, the end device 40 may perform a default action to correct the error (e.g., an autocorrect feature that remaps memory space collisions). In other embodiments, the end device 40 may prompt the user for user input (e.g., locally using the user interface circuitry 60 or remotely using HMI 52 or 16) to resolve a detected error.

If, however, the updated dynamic map 68 successfully passes the parsing and error checking of block 116, the processing circuitry 42 of the end device 44 may implement (block 118) the updated dynamic map 68. As such, the processing circuitry 42 of the end device 40 may collect and store information in the memory circuitry 44 according to the updated dynamic map 68. It may be appreciated that the updated dynamic map 68 may provide certain advantages over the use of a static map. For example, by utilizing a dynamic mapping system 70, the dynamic map 68 of an end device 40 may be updated to enable the end device 40 to appear to be (e.g. spoof, mimic, or emulate) a different manufacturer, model, or brand of end device 40 in a manner that is transparent to the controller 16, 26, or 52 (i.e., the controller is unaware that the end device 40 is not of a particular manufacturer, brand, or model). This may allow the end device 40 to communicate with the controller 16, 26, or 52 without altering the programming of the controller. Furthermore, the updated dynamic map 68 may organize the information collected and/or stored by the end device 40 differently to improve the efficiency of data exchanged with the associated controller 16, 26, or 52. For example, in certain embodiments, the updated dynamic map 68 may dictate that the information typically read by the controller 16, 26, or 52 should be arranged in contiguous or sequential memory spaces (e.g., sequential registers) such that the controller team, 26, or 52 may read a range of contiguous or sequential memory spaces (e.g., supports or registers) in a single request, improving the efficiency of communications between the end device 40 and the controller 16, 26, or 52.

Technical effects of the invention include the use of a dynamic map, implemented at the end device level of a control system, which enables an end device to emulate the static mapping used by other end device manufacturers, models, or brands. The disclosed dynamic map may therefore enable the end device to interface with a controller without updating or altering the programming of the controller. Further, the disclosed dynamic mapping system is customizable, enabling a user to alter the dynamic mapping of an end device at any point after manufacturing to mimic the static mapping of another end device manufacturer, model, or brand. The disclosed dynamic mapping system enables appropriate data type and data format conversions as well as providing for error checking. Additionally, in certain embodiments, the disclosed dynamic register mapping system may allow the dynamic register map transferred from the end device (e.g., for backup) or to the end device (e.g., for implementation). In certain embodiments, the present approach offers efficiency improvements by enabling the end device to store data in contiguous or sequential memory spaces for more efficient reading by a controller. In certain embodiments, the present approach enables a controller to provide the end device with both instrument configuration data as well a dynamic map in a single transaction. Accordingly, present embodiments enable these advantages for different address-based or register-based control system communication protocols, such as MODBUS® communication protocol.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an end device, comprising:
processing circuitry configured to execute instructions stored in at least one memory device to enable the end device to:
collect and store a plurality of measurements of operational parameters of a monitored system in the at least one memory device according to a dynamic mapping, and wherein the dynamic mapping is configured to be updatable, wherein the monitored system comprises a gas turbine system, a petrochemical refinery, a chemical production system, a water distribution system, or a waste water purification system;
error check an upcoming dynamic map before changing to the upcoming dynamic map, wherein error checking comprises ensuring that memory locations defined in the at least one memory device by the upcoming dynamic map are valid memory locations and that the memory locations do not overlap each other; and;
change to the upcoming dynamic map to enable at least one of monitoring and control of the end device using the upcoming dynamic map.

2. The system of claim 1, wherein the dynamic mapping is configured to emulate a static mapping of a different end device manufacturer, model, or brand than the end device.

3. The system of claim 1, wherein the dynamic mapping is configured to perform one or more calculations using at least a portion of the plurality of measurements collected by the end device and store an output of the one or more calculations in the at least one memory device.

4. The system of claim 1, wherein the dynamic mapping is configured to convert the plurality of measurements collected by the end device to a different data type, a different data format, or both, for storage in the at least one memory device.

5. The system of claim 4, wherein the different data format comprises a different unit of measurement, a different stored size, or a different degree of precision.

6. The system of claim 1, comprising a controller having communication circuitry configured to communicatively couple the controller with the end device via a control system network, and wherein the controller is configured to access the end device based on a static mapping of a different manufacturer, model, or brand than the end device.

7. The system of claim 6, wherein the end device and the controller are configured to communicate via a register-based input-output (I/O) protocol.

8. The system of claim 1, wherein the end device comprises a flow meter.

9. A non-transitory, computer-readable medium storing instructions executable by processing circuitry of an electronic device, the instructions comprising:
instructions to receive, at one or more processors, user input requesting an addition of a field to a dynamic map of an end device to generate an upcoming map, wherein the user input comprises:
a first user input identifying a piece of information stored or collected by the end device to be associated with the field,
a second user input identifying a location in a memory device of the end device to be associated with the field, and
a third user input identifying a data type, a data format, or both, to be associated with the field; and
instructions to add the field in the dynamic map based on the user input;
instructions to error check, at the one or more processors, the upcoming map prior to changing mapping of the end device to the upcoming map, wherein error checking comprises ensuring that memory locations defined by the upcoming map are valid memory locations and ensuring that the memory locations defined by the upcoming map do not overlap; and
instructions to change to the upcoming map based at least in part on the error check to enable at least one of monitoring and control of the end device using the upcoming map.

10. The medium of claim 9, wherein the dynamic map is configured to emulate a static mapping of a different end device manufacturer, model, or brand than the end device.

11. The medium of claim 9, wherein the end device comprises a measurement device.

12. The medium of claim 9, wherein the instructions comprise instructions to remove the field from the dynamic map to form the upcoming map, based on user input.

13. The medium of claim 9, wherein the instructions comprise instructions to change the location in the memory device associated with the field, based on user input.

14. The medium of claim 9, wherein the instructions comprises instructions to transfer the upcoming map to the end device for implementation.

15. A processor-implemented method, comprising:
changing, using one or more processors, a mapping of an end device of an industrial control system from a first dynamic map to a second dynamic map within a memory device, and wherein the first and second dynamic maps respectively define memory locations of the memory device and data formats for storing measurement data collected by the end device during operation, and wherein the first and second dynamic maps are different from one another, wherein the memory locations defined by the first and second dynamic maps are different, and wherein the data formats defined by the first and second dynamic maps are different;

error checking, at the one or more processors, the second dynamic map prior to changing the mapping of the end device, wherein error checking comprises ensuring that the memory locations defined by the second dynamic map are valid memory locations and ensuring the memory locations defined by the second dynamic map do not overlap in the memory device; and changing to the second dynamic map to at least one of control the end device and monitor the end device.

16. The method of claim 15, wherein the second dynamic map is based on a static map of a different end device manufacturer, model, or brand than the end device, and wherein the second dynamic map enables the end device to mimic the different end device manufacturer, model, or brand during operation.

17. The method of claim 15, comprising receiving the second dynamic map from a dynamic map transfer tool after the second dynamic map is generated via execution of the dynamic map configuration tool by a controller of the industrial control system.

18. The method of claim 15, wherein the end device comprises a flow meter.

* * * * *